United States Patent
Neto et al.

(10) Patent No.: US 6,298,884 B1
(45) Date of Patent: Oct. 9, 2001

(54) EBONITE HOSE

(75) Inventors: Jose Giustra Neto, Sao Paulo; Amir Borges Ferreira Junior, Minas Gerais; Waldir Pereira de Lucena, Sao Paulo, all of (BR)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/693,257

(22) Filed: Oct. 20, 2000

(51) Int. Cl.$^7$ .................................................. F16L 11/00
(52) U.S. Cl. ........................... 138/137; 138/140; 138/174
(58) Field of Search .................................... 138/125, 126, 138/137, 140, 141, 153, 172, 174

(56) References Cited

U.S. PATENT DOCUMENTS

| | | |
|---|---|---|
| 4,365,659 * | 12/1982 | Yoshida et al. ................. 152/354 R |
| 4,469,729 | 9/1984 | Watanabe et al. ...................... 428/36 |
| 5,200,258 * | 4/1993 | Tamagawa et al. ................ 428/218 |
| 5,222,770 | 6/1993 | Helevirta ............................... 285/53 |
| 5,352,507 * | 10/1994 | Bresson et al. ...................... 428/245 |
| 5,618,869 | 4/1997 | Kadomaru et al. .................. 524/261 |

* cited by examiner

*Primary Examiner*—Patrick Brinson
(74) *Attorney, Agent, or Firm*—Nancy T. Krawczyk

(57) ABSTRACT

The present invention is directed to a rubber hose wherein the reinforcing layers are formed from ebonite rubber. The ebonite rubber has a thickness sufficient to provide the desired reinforcing characteristics to the hose. The hose may be formed with integral hose flanges wherein the hose flanges are also formed from ebonite rubber.

8 Claims, 2 Drawing Sheets

EBONITE HOSE

FIELD OF THE INVENTION

The present invention is directed towards a hose. Specifically, the hose is reinforced with ebonite to provide the hose with the desired physical characteristics.

BACKGROUND OF THE INVENTION

Ebonite is a known rubber compound containing a high sulfur content, typically compounded with 30 to 50% by weight sulfur, having a high Shore A hardness. Ebonite compounds have been used in tank linings for chemical products and in other applications where hardness and impermeability are desired. For example, U.S. Pat. No. 4,469,729 discloses that in the past, for flexible articles such as belts, hoses, and diaphragms, the inner surface of the article was harden by ebonite formation. This was done to improve wear resistance, reduce friction, and provide for a barrier effect.

U.S. Pat. No. 5,222,770 discloses a high-pressure hydraulic hose. The multi-layered hose has an inner layer, an intermediate insulation layer, and an outer layer. Between the layers are several conductive layers. The inner, intermediate, and outer layers may be rubber or ebonite.

While ebonite has been used as an alternative to rubber layers in various articles, the presently disclosed invention is directed towards previously unappreciated benefits of ebonite in an article.

SUMMARY OF THE INVENTION

The present invention is directed to a light weight, inexpensive hose and a method of forming such a hose.

The inventive hose is comprised of at least a cover layer, an innermost layer, and at least one intermediate reinforcing layer. The reinforcing layer is formed from an ebonite rubber.

In one aspect of the invention, the ebonite rubber comprising the at least one reinforcing layer has a Shore D hardness in the range of 75 to 100, preferably 90 to 100.

In another aspect of the invention, the ebonite rubber comprising the at least one reinforcing layer has a sulfur content of 10 to 50% by weight.

In another aspect of the invention, the hose is formed with an integral flange formed at at least one end of the hose. The hose is formed with the integral flange being comprised of a central disc of ebonite rubber.

Also disclosed in a method of forming a hose comprising an inner layer, at least one intermediate reinforcing layer, and an outer layer. The method is comprised of forming an inner layer, applying a reinforcing layer of uncured ebonite rubber over the inner layer, and applying a cover layer to form a hose assembly. The hose assembly is cured to form the hose.

In another aspect of the disclosed method of forming a hose, the ebonite rubber is applied until it reaches the thickness required to achieve a desired strength in the cured hose.

In another aspect of the disclosed method of forming a hose, an ebonite disc is applied to at least one end of the hose assembly prior to curing the hose assembly to form an integral flange on the hose.

BRIEF DESCRIPTION OF THE DRAWINGS

The invention will be described by way of example and with reference to the accompanying drawings in which.

DETAILED DESCRIPTION OF THE PREFERRED EMBODIMENTS

Figure 1:
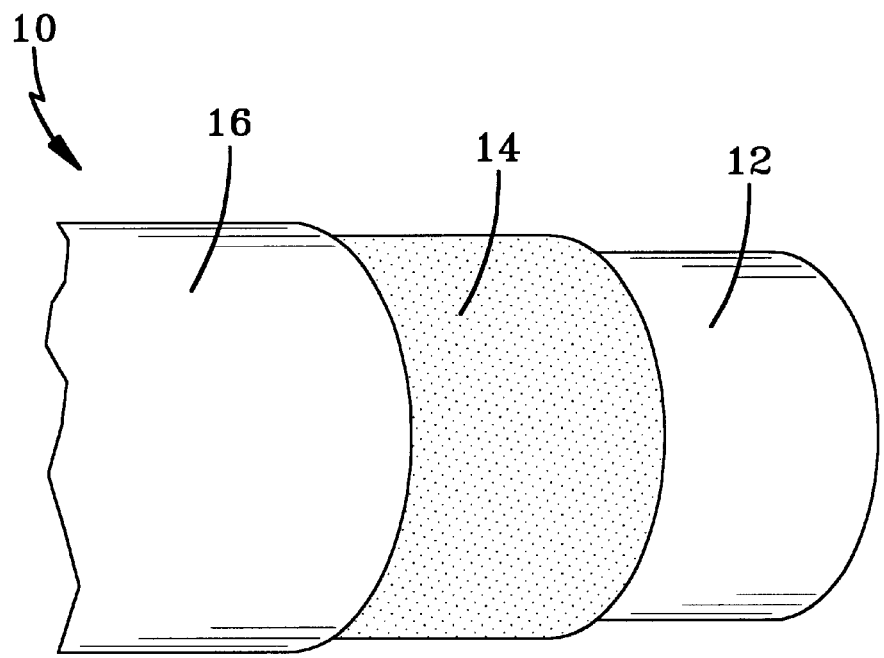
FIG. 1 is a hose formed in accordance with the present invention.

FIG. 1 illustrates a hose 10. The hose 10 has the simplest construction that is in accordance with the present invention. The hose 10 has an inner layer 12, an intermediate reinforcing layer 14, and a cover layer 16. The inner layer 12 and the cover layer 16 are formed of conventional hose materials, including thermoplastic and thermoelastic materials. The material selection will vary depending upon the application and desired properties of the hose. The inner layer 12 is selected to be resistant to the material to be conveyed by the hose 10. The intermediate reinforcing layer 14, instead of being the conventional textile or metallic reinforcement layer, is an ebonite layer. The reinforcing ebonite layer 14 is built up to a thickness to accomplish the desired strengthening of the hose to replace the various conventional reinforcement layers typically found in a hose. In forming the ebonite reinforced hose, after the inner layer 12 is formed, either by extrusion about a mandrel or form or by winding unvulcanized rubber about a mandrel, the ebonite rubber is extruded over the uncured inner layer or sheets of uncured ebonite rubber is wound over the uncured inner layer until the desired thickness to obtain the required strength in the cured hose is achieved.

The ebonite rubber has a base rubber of any sulfur vulcanizable rubber, and a sulfur content of 10 to 50% by weight, preferably 10 to 20% by weight. The ebonite rubber has a Shore D hardness of 75 to 100, preferably 90 to 100 Shore D.

Figure 2:
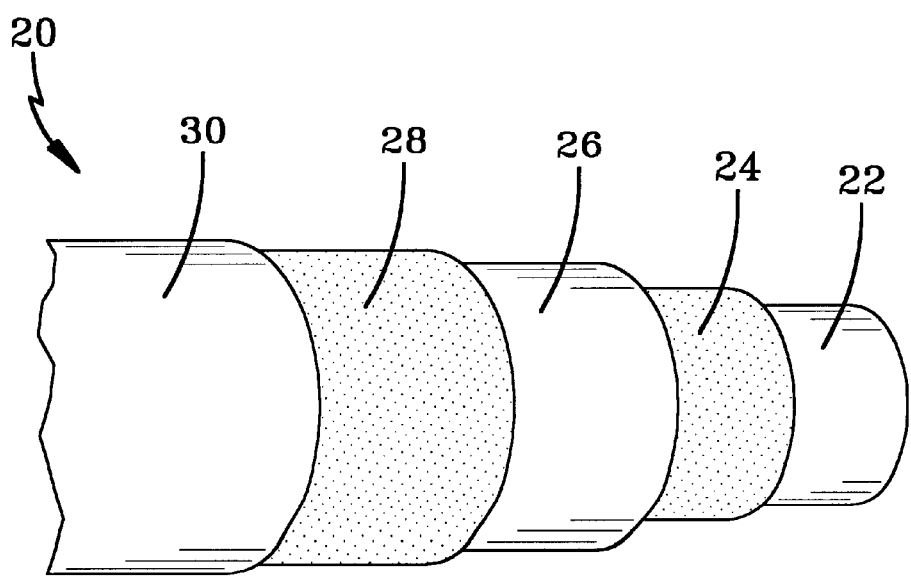
FIG. 2 is another embodiment of the present invention.

The hose may be formed with more than the three specified layers. The hose may also have an intermediate rubber layer, see FIG. 2. The hose 20 has an inner layer 22, a reinforcing layer 24, an intermediate rubber layer 26, a second reinforcing layer 28, and a cover layer 30.

A hose may be formed in any lay-up construction known to those in the art. For example, the inner layer 12 or 22 may be several layers, including a barrier layer, a friction layer, and an adhesive layer. Whatever construction is chosen for the hose, the main reinforcing layer of the hose is formed from an ebonite rubber material.

The hoses 10, 20 formed in accordance with the present invention are most suitable for use as suction and discharge hoses, since such hoses do not require a high degree of flexibility. Such hoses 10, 20 are used for transporting ore slurry, water, chemical products, and other such flowable materials. It is desired that suction and discharge hoses be highly durable since the hose is subject to extreme working conditions, including being dragged and pulled along rough surfaces. Because an operator may carry the hose around, it is also desired to reduce the weight of the hose. The use of the ebonite in the hose provides the hose with the desired strength needed for such a hose, while reducing the weight and the cost of the hose.

To further reduce the weight of the discharge hose, the hose may be formed such that the conventional iron flanges attached to the ends of the hose are eliminated, as disclosed in a further embodiment of the present invention.

Figure 3:
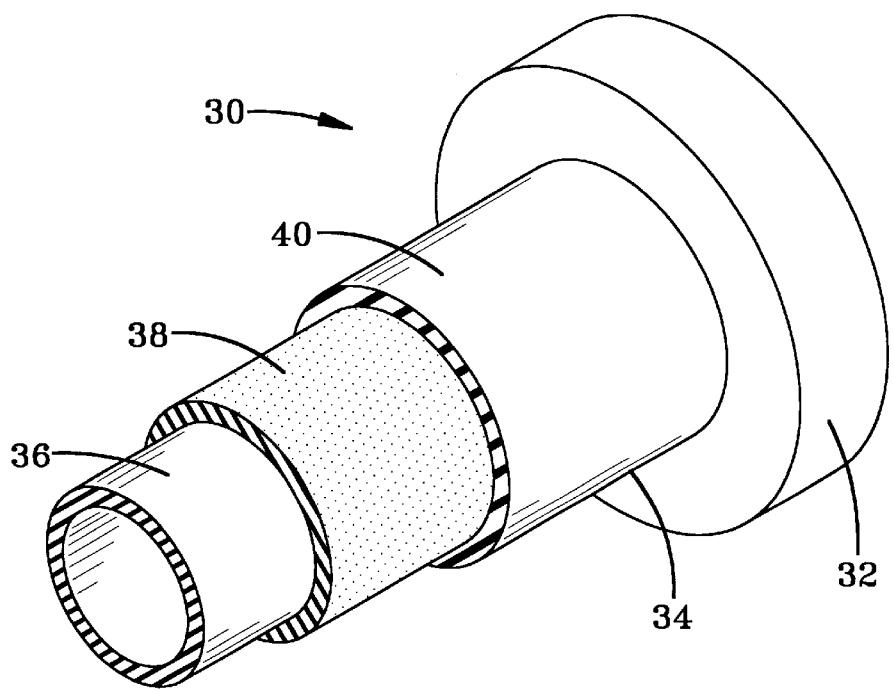
FIG. 3 is hose with an integral flange.

FIG. 3 illustrates a hose 30 formed with an integral flange 32. The body 34 of the hose 30 is formed in accordance with the simplest hose construction, as disclosed previously. The hose 30 has an inner layer 36, an intermediate reinforcing layer 38, and a cover layer 40. A flange 32 is formed at at least one end of the hose 30.

Figure 4:
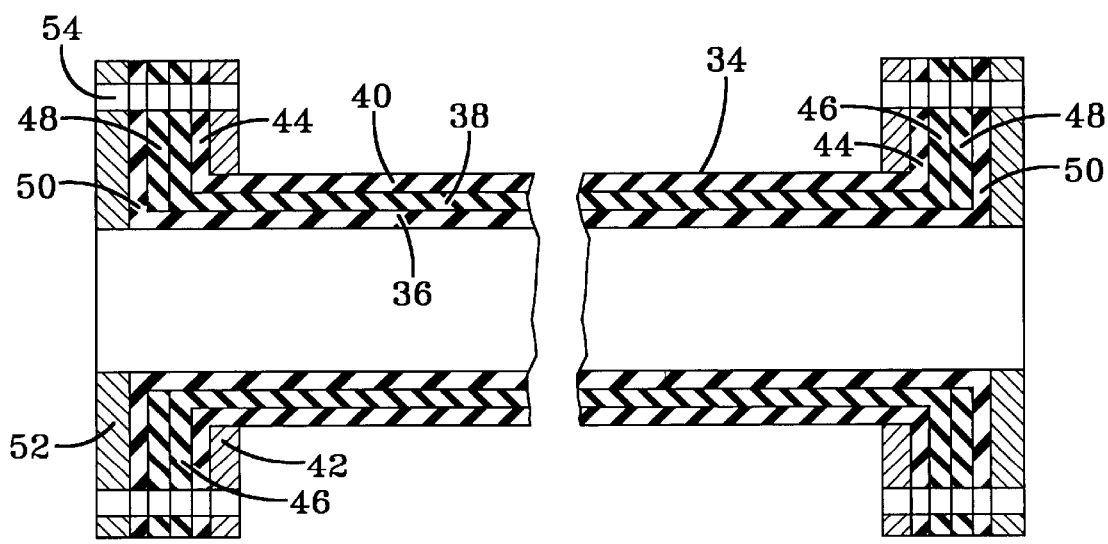
FIG. 4 illustrates the assembly method for forming the hose with an integral flange.

FIG. 4 illustrates a hose being formed with integral flanges 32 at both ends of the hose 30; however, if desired, the flange 32 may be formed at only one end of the hose 30. The desired inner layer 36 is first applied to a mandrel (not illustrated). Over the inner layer 36, the necessary layers of ebonite 38 are applied until the specified thickness to achieve the desired reinforcement of the hose 30 is achieved. The cover layer 40 is then applied to form a hose assembly. Nylon tape (not illustrated) is then applied over the hose assembly.

Two-part flanges 42 are placed near the ends of the hose assembly. The ends 44 of the cover layer 40 are turned up over the two-part flanges 42. The ends 46 of the ebonite layers 38 are then also turned up, adjacent the ends 44 of the cover layer 40. Discs of ebonite 48 are placed against the turn up ends 44; each ebonite disc 48 preferably has the same thickness as the conventional steel flange that the disc 48 is replacing. The ends 50 of the inner layer 36 are turned up adjacent the discs 48. Curing flanges 52 are then placed over the turned up ends 44, 46, 50 and discs 48. The final hose assembly is cured, after which the two-part flanges 42, the cure flanges 52, and the nylon tape are removed. Following curing the ebonite disc 48 and the turned up ends 44, 46, 50 of the hose layers 36, 38, 40 are transformed into the integrally formed rigid flanges 32.

The above formed method is one method of constructing the integral flanges 32. In an alternative method, instead of turning up the ends of the various hose layers 36, 38, 40 to sandwich the ebonite disc 48, layers of material corresponding to the material of each layer may instead be applied to the ends of the hose assembly. After the hose assembly is prepared on a mandrel, the two-part flanges 42 are placed at the ends of the hose assembly. If it is desired to form only one flange 32, than a two-part flange 42 is located at only one end of the hose assembly.

Rubber layers of the same material as the cover layer 40 are applied over the flanges 42. Discs of ebonite are applied. Ebonite rubber layers corresponding to the layer 38 may be applied to the ebonite discs. If no such additional ebonite layers are applied, than the ebonite disc has the same composition as the layer 38. Rubber layers corresponding in material to the material of the inner layer 36 are placed over either the ebonite discs or the additional ebonite layers, encapsulating the ebonite between the two different non-ebonite rubber layers. Curing flanges 50 are than placed over the built up layers and the final hose assembly is cured.

The flange 32 may be provided with passageways 54 for bolts or other mechanical mechanism to be inserted into the flange for securing the hose 30 to other hoses, couplings, or fittings when the hose 30 is in use. These passageways 54 are formed when the hose 30 is cured.

By forming the inventive hose with integral ebonite flanges, the conventional hose constructed from tire cord plies, steel wires, and metal flanges is replaced by a light weight, rigid, and less expensive hose.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is therefore to be understood that changes can be made in the particular embodiments described which will be within the full intended scope of the invention as defined by the following appended claims.

What is claimed is:

1. A hose comprising at least a cover layer, an innermost layer, and at least one intermediate reinforcing layer, the hose being characterized by:

the at least one reinforcing layer being formed of an ebonite rubber, the ebonite rubber having a Shore D hardness in the range of 75 to 100.

2. A hose in accordance with claim 1 wherein the hose is further characterized by the ebonite rubber forming the reinforcing layer having a Shore D hardness in the range of 90 to 100.

3. A hose in accordance with claim 1 where in the ebonite rubber has a sulfur content of 10 to 50% by weight.

4. A hose in accordance with claim 1 wherein the hose is further characterized by having an integral flange formed at at least one end of the hose.

5. A hose in accordance with claim 4 wherein the hose is further characterized by the integral flange being comprised of a central disc of ebonite rubber.

6. A method of forming a hose comprising an inner layer, at least one intermediate reinforcing layer, and an outer layer, the method comprising forming an inner layer, applying a reinforcing layer over the inner layer, and applying a cover layer to form a hose assembly, and curing the hose assembly to form a cured hose, the method being characterized by:

applying uncured ebonite rubber to form the reinforcing layer.

7. A method of forming a hose in accordance with claim 6 wherein the method is further characterized by applying the uncured ebonite rubber to a thickness to achieve a required strength in the cured hose.

8. A method of forming a hose in accordance with claim 6 wherein the method is further characterized by applying an ebonite disc to at least one end of the hose assembly prior to curing the hose assembly to form an integral flange on the hose.

* * * * *